United States Patent [19]

van Paassen et al.

[11] 4,421,930

[45] Dec. 20, 1983

[54] PROCESS FOR PREPARING A PUMPABLE SURFACE-ACTIVE PRODUCT BASED ON POLYESTER ACETIC ACID

[75] Inventors: Nicolaas A. I. van Paassen, Bodegraven; Hermanus C. H. van Riel, Waddinxveen, both of Netherlands

[73] Assignee: Chem-Y Fabriek van Chemische Produkten B.V., Bodegraven, Netherlands

[21] Appl. No.: 294,041

[22] Filed: Aug. 18, 1981

[30] Foreign Application Priority Data

Aug. 26, 1980 [DE] Fed. Rep. of Germany ....... 3032061

[51] Int. Cl.³ .................... C07C 59/66; C07C 59/10
[52] U.S. Cl. .................... 562/470; 562/587; 260/501.13
[58] Field of Search ............ 562/471, 587, 470

[56] References Cited

U.S. PATENT DOCUMENTS

| 2,516,611 | 7/1950 | Berhenke et al. | 562/471 |
|---|---|---|---|
| 2,623,900 | 0/1952 | Hofer | 562/471 |
| 3,565,844 | 2/1971 | Grace | 562/471 |
| 3,959,460 | 5/1976 | Vanlergerghe | 562/471 |
| 3,992,443 | 11/1976 | Springmann | 562/587 |

FOREIGN PATENT DOCUMENTS 1027481 4/1960 United Kingdom ............... 562/587

*Primary Examiner*—Paul J. Killos
*Attorney, Agent, or Firm*—Browdy and Neimark

[57] ABSTRACT

A process for preparing a pumpable surface active product based on polyether acetic acid is described, wherein 1–10% water and an acid is added to a crude reaction mixture obtained by reacting in an alkaline medium an adduct of the formula RO—$(C_2H_4O)_x$H with a compound Hal—$CH_2$ COOM, wherein R is a hydrophobic, aliphatic or aliphatic-aromatic residue, x is a number having an average value of 0.5–10, Hal is a halogen atom and M represents an alkali metal, the amount of acid added being such that a 10-percent aqueous solution of the product shows a pH of 4–7. Preferably about 7% of water is added and also it is preferred to add so much acid that a pH of about 5–6 is obtained.

8 Claims, No Drawings

PROCESS FOR PREPARING A PUMPABLE SURFACE-ACTIVE PRODUCT BASED ON POLYESTER ACETIC ACID

BACKGROUND OF THE INVENTION

Polyether carboxylic acids of the formula RO—$(C_2H_4O)_x$CH$_2$COOH, wherein R represents a hydrophobic, aliphatic or aliphatic-aromatic residue and x is a number having an average value of about 0.5–10, as well as their alkali metal, alkaline earth metal and quaternary ammonium salts are known surface active compounds which have become of importance in many fields during the last decennia.

In practice such compounds are prepared according to the principles of U.S. Pat. No. 2,623,900, the contents of which are incorporated herein by reference. According to this patent an ethoxylated product of the formula RO—$(C_2H_4O)_x$H is reacted in an alkaline medium with an aklaki metal salt of a halo-acetic acid, i.e. with a compound Hal—CH$_2$COOM, wherein Hal is a halogen atom and M an aklaki metal. Normally, the salt is a sodium salt, so that the obtained mixture besides the desired final product and unreacted starting product (which is also somewhat surface active and accordingly does not interfere), contains also sodium chloride, which per se is often used as thickening agent for liquid detergents and the like, and accordingly either is useful or in the worst case still is not damaging. In large scale commercial operations, accordingly, it would be desirable, if the so obtained crude reaction mixture could be sold as final product without a complicated further processing, i.e. at low expenses. However, up till now this was not possible, because the obtained mixture is extremely viscous to pasty to almost solid. Of course, the consistency of the obtained product depends somewhat on the nature of the starting materials and the reaction conditions, but this consistency is always such that at room temperature or even at slightly elevated temperatures the product is difficult to handle.

This complication also appears from the examples of U.S. Pat. No. 2,623,900. These examples all describe laboratory experiments and for a part pure compounds are prepared therein, but in examples 4, 6 and 7 technical grade products are used as starting products. As appears from these examples, the direct product of the reaction is always a highly viscous liquid or a paste. In examples 4 and 7 this product is simply dissolved in water. In large scale operations this would mean that an aqueous solution of the crude product would have to be shipped and sold, which of course is not particularly agreeable from an economical standpoint. According to example 6 of the U.S. patent another solution for the problem is chosen, i.e. the obtained mixture is first treated with sulphuric acid, in order to neutralize the excess of sodium hydroxide. Thereby a clear, wax-like mass is obtained which is then spray-dried. However, even in the laboratory this is not a generally valid solution for the problem, because spray-drying is only possible in specific cases. Thus, in the above mentioned example it concerned a product obtained from an adduct of technical grade cetylalcohol with two oxyethylene units. However, most of the crude reaction products in this class are of such a consistency that spray-drying to obtain a really dry product is not feasible, at least at an acceptable price. Moreover, spray-drying has the disadvantage that a relatively expensive treatment is used for a crude product which after that still remains a crude product.

Therefore in the actual practice of large scale operations one usually works in such a way that the crude reaction product is reacted with an excess of acid, usually sulphuric acid, in order to liberate the free polyether carboxylic acid, as is also described in examples 1 and 3 of the above mentioned U.S. patent. Therein diluted sulphuric acid is used and in this way the desired acid is obtained as an oil layer which can be separated from the aqueous layer. Usually, the so obtained acid is then neutralized again, in order to obtain the desired salt, which is then sold either as such or in the form of an aqueous solution. Although in this way a certain purification is attained, this process also removes the originally obtained sodium chloride which is useful for many uses of the product and does not interfere with other uses. Moreover, first an excess of diluted sulphuric acid and then again a base is added and even if this base is a cheap sodium hydroxide solution, this still means a waste of chemicals. When then finally a solution of the product is shipped, this again means a waste, because also a large amount of water is shipped.

Accordingly, it would be desirable to have available a cheap and simple process which makes it possible to convert the obtained high viscosity crude reaction mixture to a pumpable product which can be sold as such.

SUMMARY OF THE INVENTION

It has now been found that a pumpable mixture can be obtained by adding to the crude reaction mixture a small amount of water and such an amount of acid that the mixture (measured in a suitable dilution) shows a pH-value in the neutral or weakly acidic range.

This invention accordingly provides a process for preparing a pumpable surface-active product on the basis of polyether acetic acid, wherein a crude reaction mixture, obtained by reacting in an alkaline medium an adduct of the formula RO—$(C_2H_4O)_x$H with a compound Hal—CH$_2$—COOM, wherein R is a hydrophobic, aliphatic or aliphatic-aromatic residue, x is a number having an average value of 0.5–10, Hal is a halogen atom and M is an alkali metal, is mixed with 1–10% water and such an amount of acid that a 10-percent aqueous solution of the products shows a pH of 4–7.

It should still be remarked that also without additional water the viscosity of the mixture decreases by the addition of acid. However, a suitable consistency in most cases is then only obtained at a pH-value at which the mixture has already an aggresive action. By the present combination of the addition of a small amount of water and almost neutralization, mixtures are obtained which are sufficiently fluid to be pumped without having an aggressive action.

Because the obtained mixtures still are relatively highly viscous and contain only a small amount of water, all pH-values are measured in 10% aqueous solutions of the obtained product.

DESCRIPTION OF PREFERRED EMBODIMENTS.

The optimum pH-value, and accordingly the optimum amount of acid, depends somewhat on the exact nature of the hydrophobic residue R and of the number x of the ethoxy groups. This optimum value can easily be determined experimentally for each separate case.

It is very important that the pH should not be decreased essentially below the above mentioned limit of 4, because otherwise the product is converted to a too high degree to the free acid which is an oily liquid so that separation of phases would occur. When strong acids, such as hydrochloric acid or sulphuric acid, are used, it is preferred to lower the pH to a value not below 5.

The nature of the acid used for the neutralization is rather indifferent. Only, it is a matter of course that one should not use a strongly oxidizing acid, such as nitric acid. Because it concerns here crude products from industry, it will often be preferred to use the cheapest possible acid and in that case sulphuric acid or hydrochloric acid is a good choice. On the other hand, many organic sulphonic acids are of interest, since these acids themselves possess surface-active properties and perhaps can also serve as lubricants for some purposes. A suitable acid in this respect is dodecylbenzenesulphonic acid.

The pumpable mixtures obtained according to the invention can be used for numerous usual purposes, for instance as raw materials for detergents in the widest sense of the word (such as laundering agents, special purpose laundering agents, dish-washing agents) as emulsifiers (e.g. for polymerizations and for high molecular products, also for calf-milk) and as additives for the tertiary oil production.

EXAMPLES

The invention is further elucidated with the following examples, which serve as an illustration of the invention only and do not limit the invention in any way.

In these examples three reaction products were used:

Product 1: crude reaction mixture obtained by reacting an adduct from C12/14 fatty alcohol (50% lauryl and 50% myristyl alcohol) and 4-5 moles of ethylene oxide with sodium chloroacetate in an alkaline medium.

Product 2: as product 1, but with a lauryl/myristyl ratio of 70:30.

Product 3: crude reaction mixture obtained by reacting an adduct from nonylphenol and 6 moles of ethylene oxide with sodium chloroacetate in an alkaline medium.

REMARK:

In the industrial practice this reaction is only carried out with an excess of sodium chloroacetate, if the product is intended for cosmetic purposes. Because the starting product is also a surface active substance, the sodium chloroacetate, however, is usually used in a less than stoichiometric amount, and then a good conversion is attained by intensive stirring. In the present cases the conversion for product 1 was 65.1%, for product 2 it was 64.9%, and for product 3 it was 65.2%. In large scale operations these conversions are to be considered high.

EXAMPLE 1

Products 1 and 2 were neutralized with about 1% of dodecylbenzenesulphonic acid to pH 6 and diluted with varying amounts of water. The consistency was determined after 4 days at 20° C. and after 2½ hours at 6° C. and the results have been given in the following table. The signs therein have the following meanings: − = solid; +/− = highly viscous (not pumpable) and + = fluid.

|  | water, % | | | | | | | | | |
|---|---|---|---|---|---|---|---|---|---|---|
|  | 2 | 4 | 5 | 6 | 6.5 | 7 | 7.5 | 8 | 9 | 10 |
| Product 1 | | | | | | | | | | |
| After 4 days at 20° C. | +/− | + | + | + | + | + | + | + | + | − |
| After 2½ hours at 6° C. | − | − | − | +/− | + | + | + | + | +/− | − |
| Product 2 | | | | | | | | | | |
| After 4 days at 20° C. | | + | + | + | + | + | + | + | + | |
| After 2½ hours at 6° C. | | − | +/− | + | + | + | + | + | − | |

It appears from the above experiments that at a constant pH value a pumpable product is obtained only within a limited range of water contents. A too large water content actually has a gelling effect.

EXAMPLE 2

Experiments were carried out with products 2 and 3, wherein varying amounts of water and/or acid were added. The pH values again were measured in 10% solutions; for the measurements of the viscosities of course the obtained mixtures themselves were used. In many cases also the change in viscosity over a certain period was followed. All viscosities were measured at 20° C. The following acids were used:

DBS = Dodecylbenzene sulphuric acid

HCl = 37% hydrochloric acid. In this case, of course the water content of the hydrochloric acid was taken into account for determining the amount of water to be added.

LMAS = Lauryl-Myristyl acid sulphate, i.e. the monosulphuric acid ester of an adduct from a mixture of lauryl and myristyl alcohol (50:50) and 2.2 molar equivalents ethylene oxyde.

The results are as follows:

| % H$_2$O | Acid | % Acid | pH | Viscosity, cps, after ... days | | | | | |
|---|---|---|---|---|---|---|---|---|---|
|  |  |  |  | 1 | 3 | 6 | 14 | 21 | 180 |
| Product 2 | | | | | | | | | |
| 0 | — | — | 7.1 | 30000 | solid | | | | |
| 1 | — | — | 7.1 | 2750 | 3800 | solid | | | |
| 3 | — | — | 7.1 | 6500 | 7000 | solid | | | |
| 5 | — | — | 7.1 | 4700 | 5700 | 21000 | solid | | |
| 10 | — | — | 7.1 | 83000 | solid | | | | |
| 0 | DBS | 2 | 5.6 | solid | | | | | |
| 1 | DBS | 2 | 5.6 | 2300 | 18500 | solid | | | |
| 3 | DBS | 2 | 5.6 | 2200 | 4500 | 47000 | solid | | |
| 5 | DBS | 2 | 5.6 | 3700 | 3300 | 3300 | 12500 | | |

-continued

| % H₂O | Acid | % Acid | pH | \multicolumn{6}{c}{Viscosity, cps, after ... days} |
|---|---|---|---|---|---|---|---|---|---|
| | | | | 1 | 3 | 6 | 14 | 21 | 180 |
| 10 | DBS | 2 | 5.6 | 25000 | 55000 | solid | | | |
| 7 | DBS | 1 | 6.0 | 9500 | | | | | 4000 |
| 7 | DBS | 2 | 5.6 | 2050 | | | | | 4700 |
| 7 | DBS | 3 | 5.4 | 2000 | | | | | 4400 |
| 7.0 | HCl | 0 | 7.1 | solid | | | | | |
| 6.5 | HCl | 0.5 | 5.6 | 3100 | 7000 | 14500 | | | |
| 6.0 | HCl | 1.0 | 5.4 | 3000 | 4500 | 6400 | | | |
| 5.5 | HCl | 1.5 | 5.1 | 2600 | 2600 | 6000 | | | |
| 7 | LMAS | 1 | 5.7 | 2200 | 12000 | 12000 | 12000 | | |
| 7 | LMAS | 2 | 5.6 | 2100 | 2500 | 2500 | 11000 | | |
| 7 | LMAS | 3 | 5.4 | 2000 | 2600 | 2900 | 14500 | | |
| Product 3 | | | | | | | | | |
| 0 | — | — | 7.2 | solid | | | | | |
| 1 | — | — | 7.2 | 25000 | 32000 | 27000 | 36000 | | |
| 3 | — | — | 7.2 | 14500 | 15500 | 15000 | 22000 | | |
| 5 | — | — | 7.2 | 11000 | 10500 | 10500 | 13500 | | |
| 10 | — | — | 7.2 | 10000 | 14000 | 20000 | 21000 | | |
| 0 | DBS | 2 | 5.8 | solid | | | | | |
| 1 | DBS | 2 | 5.8 | 20000 | 25000 | 24000 | 36000 | | |
| 3 | DBS | 2 | 5.8 | 12500 | 13500 | 13500 | 20000 | | |
| 5 | DBS | 2 | 5.8 | 9000 | 9000 | 9000 | 12000 | | |
| 10 | DBS | 2 | 5.8 | 6100 | 6500 | 7200 | 7500 | | |
| 7 | DBS | 1 | 6.1 | 8000 | 8500 | 8000 | | 12500 | |
| 7 | DBS | 2 | 5.8 | 7250 | 7250 | 8800 | | 9500 | |
| 7 | DBS | 3 | 5.5 | 7000 | 7000 | 7600 | | 9500 | |

As appears from the above, the best results are obtained with an addition of water in an amount of about 7%. Furthermore, it appears from these experiments that dodecylbenzene sulphonic acid is a particularly suitable acid.

It will be apparent from the foregoing description that a novel process for preparing a pumpable surface-active product, based on polyether acetic acid, is provided, which is not limited to the specific embodiments of the above examples. Thus, any suitable not strongly oxidizing acid can be substituted for those specifically disclosed and the pH can be adjusted at any value in the range of 4–7.

What is claimed is:

1. A process for preparing a pumpable liquid surface-active product, based on polyether acetic acid, which comprises
   to a crude reaction mixture, obtained in extremely viscous, pasty or almost solid form by reacting, in a non-aqueous alkaline medium, an adduct of the formula RO—(C₂H₄O)$_x$H with a compound Hal—CH₂COOM, wherein R is a hydrophobic, aliphatic or aliphatic-aromatic residue, x is a number having an average value of 0.5–10, Hal is a halogen atom and M represents an alkali metal,
   adding an amount in the range of 1–10% of water effective to obtain a substantial decrease in viscosity without the occurrence of gelling and such an amount of acid that a 10 percent aqueous solution of the product shows a pH in the range of 4–7, said amount of acid being insufficient to cause phase separation, to provide said pumpable liquid surface-active product.

2. A process according to claim 1, wherein an amount of water of about 7% is used.

3. A process according to claim 1, wherein an organic sulphonic acid is used as the acid.

4. A process according to claim 2, wherein an organic sulphonic acid is used as acid.

5. A process according to claim 3, wherein dodecylbenzene sulphonic acid is used.

6. A process according to claim 4, wherein dodecylbenzene sulphonic acid is used.

7. A process according to claim 1, wherein the acid is added in an amount to obtain a pH of about 5–6.

8. A process according to claim 2, wherein acid is added in an amount to obtain a pH in the range of about 5–6.

* * * * *